United States Patent [19]
Bock et al.

[11] 3,900,868
[45] Aug. 19, 1975

[54] APPARATUS AND METHOD FOR PULSE TRACKER RANGING EQUIPMENT WITH INCREASED RESOLUTION

[75] Inventors: Joseph J. Bock; William S. Dunham, both of Phoenix, Ariz.

[73] Assignee: Sperry Rand Corporation, New York, N.Y.

[22] Filed: Mar. 22, 1974

[21] Appl. No.: 453,613

[52] U.S. Cl............................. 343/7.3; 343/5 DP
[51] Int. Cl.²...................... G01S 9/14; G01S 9/56
[58] Field of Search..................... 343/5 DP, 7.3

[56] References Cited
UNITED STATES PATENTS

| | | | |
|---|---|---|---|
| 3,405,260 | 10/1968 | Close et al. | 343/7.3 X |
| 3,794,994 | 2/1974 | Leibowitz et al. | 343/5 DP |

*Primary Examiner*—T. H. Tubbesing
*Attorney, Agent, or Firm*—Howard P. Terry

[57] ABSTRACT

A pulse tracker particularly for use in airborne distance measuring equipment (DME). A transmitter-receiver in the aircraft transmits a coded pulse pair to a ground based transponder which, in response thereto, transmits another coded pulse pair for receipt by the airborne receiver. A second order digital recursive servo in the aircraft effects a predictive routine during each pulse transmission interval to predict the time of receipt of the next following pulse thereby predicting the range for that pulse interval. A range gate is generated in accordance with the predicted range to coincide with the expected arrival time of the next following pulse. Precision clock pulses are gated into a counter in accordance with the time interval between the transmission of a pulse and the receipt of the corresponding pulse from the transponder thereby providing a digital measure of the actual range of the aircraft with respect to the transponder. The predictive routine obtains the difference between the measured range and the predicted range thereby providing a range error. The current range error is added to the accumulated sum of past range errors from prior pulse intervals. The current range error and the accumulated range errors are each multiplied by respective constants less than unity by shifting operations. The predictive routine adds the current range error multiplied by its constant and the sum of the range errors multiplied by its constant to the predicted range for the current pulse interval to obtain the predicted range for the next pulse interval. The averaging effect of accumulating the range errors and multiplying by a constant less than unity accurately provides additional bits of resolution than could be obtained from the basic system clock frequency.

36 Claims, 3 Drawing Figures

APPARATUS AND METHOD FOR PULSE TRACKER RANGING EQUIPMENT WITH INCREASED RESOLUTION

BACKGROUND OF THE INVENTION

1. Field of the Invention

The invention relates to pulse tracker ranging radar systems and particularly to digital DME.

2. Description of the Prior Art

As is known the established DME system for aircraft navigation comprises a network of ground based transponders or beacons adapted to respond to aircraft interrogations. The transmitter-receiver carried by the aircraft interrogates a selected ground station by transmitting a pair of pulses designated as P1TX and P2TX on a predetermined rf carrier with a predetermined pulse spacing therebetween. A ground based transponder tuned to receive the selected rf carrier and having a pulse spacing decoder to detect the coded pulse spacing, transmits a pair of pulses designated as P1RX and P2RX in response to the P1TX and P2TX pulses after a fixed delay with respect to the receipt thereof. The ground based transponder generally transmits the P1RX and P2RX pulse pair on a carrier different from the P1TX and P2TX pulses and with a different pulse spacing from that of the P1TX and P2TX pulses. The transmitter-receiver in the aircraft is tuned to the rf carrier of the transponder and has a pulse spacing decoder to detect the particular spacing between the P1RX and P2RX pulse pair. By measuring the elapsed time between the transmission of the P1TX pulse and the receipt of the corresponding P1RX pulse with the fixed transponder delay subtracted therefrom, the distance between the airborne transmitter-receiver and the ground based transponder is determined.

The receiving and transmitting rf carrier frequencies for the ground based transponders as well as the air-to-ground spacing (A/G) for the P1TX and P2TX pulses and ground-to-air spacing (G/A) for the P1RX and P2RX pulses are established parameters for the network of the DME transponders in accordance with the ARINC specifications. Thus, in order to interrogate a particular transponder to determine the distance therefrom, the airborne DME transmitter is tuned to the receiving carrier frequency of the transponder and the transmitter A/G spacing is accordingly adjusted. In a similar manner the airborne DME receiver is tuned to the transmitting rf carrier frequency of the transponder and the receiver decoder is adjusted to the G/A spacing of the transponder.

Present day aircraft DME is primarily used for enroute navigation requiring an accuracy of approximately 0.1 nautical miles. The pulse acquisition and tracking servos that lock onto the received pulse transmissions and provide a measure of distance are instrumented utilizing analog as well as digital designs. A typical digital instrumentation is to gate precision clock pulses into a counter in accordance with the time elapsed between the transmission of the aircraft pulses and the receipt of the corresponding transponder pulses minus the transponder fixed delay. In order to achieve an accuracy and resolution of 0.1 nautical miles, a clock frequency less than one megahertz and corresponding digital circuitry may be utilized. As is known, such circuitry is well developed, inexpensive and highly reliable. Because of the low accuracy requirement of such systems, first order tracking servos are often utilized which have velocity lag errors due to the relative velocity between the aircraft and the ground based transponder.

DME's for terminal navigation are presently under consideration for use in instrument landing systems. It would be desirable in such systems for the DME to provide an accurate range resolution of approximately 0.001 nautical miles. In order for a digital tracking servo to provide such resolution, a basic system clock frequency of approximately 80 megahertz is required. Digital circuitry for operation at 80 megahertz, while commercially available, is exceedingly complex and difficult to utilize. Such circuitry results in undesirably complex and expensive digital processing apparatus which is particularly unsuitable for aircraft installation. Commonly available, and less expensive circuits that operate at, for example, 16 megahertz would result in exceedingly simpler digital processing circuitry compared to the higher frequency variety. A 16 megahertz basic system clock would, however, only provide a resolution of 0.005 nautical miles which is inadequate accuracy for terminal area navigation DME.

SUMMARY OF THE INVENTION

The present invention provides a digital DME range tracker that accurately provides additional bits of resolution than could be obtained from the basic system clock frequency. The range tracker acheives a resolution of 0.001 nautical miles with a system clock of approximately 16 megahertz. This resolution is achieved by utilizing a digital second order range tracking servo that implements the equation $$PR_{N+1} = PR_N + K_1 \Delta R_N + K_2 \sum_0^N \Delta R$$

where $PR_{N+1}$ is the predicted range for sample time $N + 1$ computed at time $N$;

$PR_N$ is the predicted range for sample time $N$ computed at time $N-1$;

$\Delta R_N = MR_N - PR_N$;

$MR_N$ is the measured range at time $N$;

$\Delta R$ is the difference between the predicted range and the actual measured range, and $K_1$ and $K_2$ are servo loop time constants of absolute value less than unity.

Additional bits of resolution are obtained by the shifting and error averaging processes represented by the term $$K_1 \Delta R + K_2 \sum_0^N \Delta R.$$

Additionally, the servo system response characteristics are readily adjustable by selecting the values of $K_1$ and $K_2$.

DESCRIPTION OF THE PREFERRED EMBODIMENT

Figure 1:
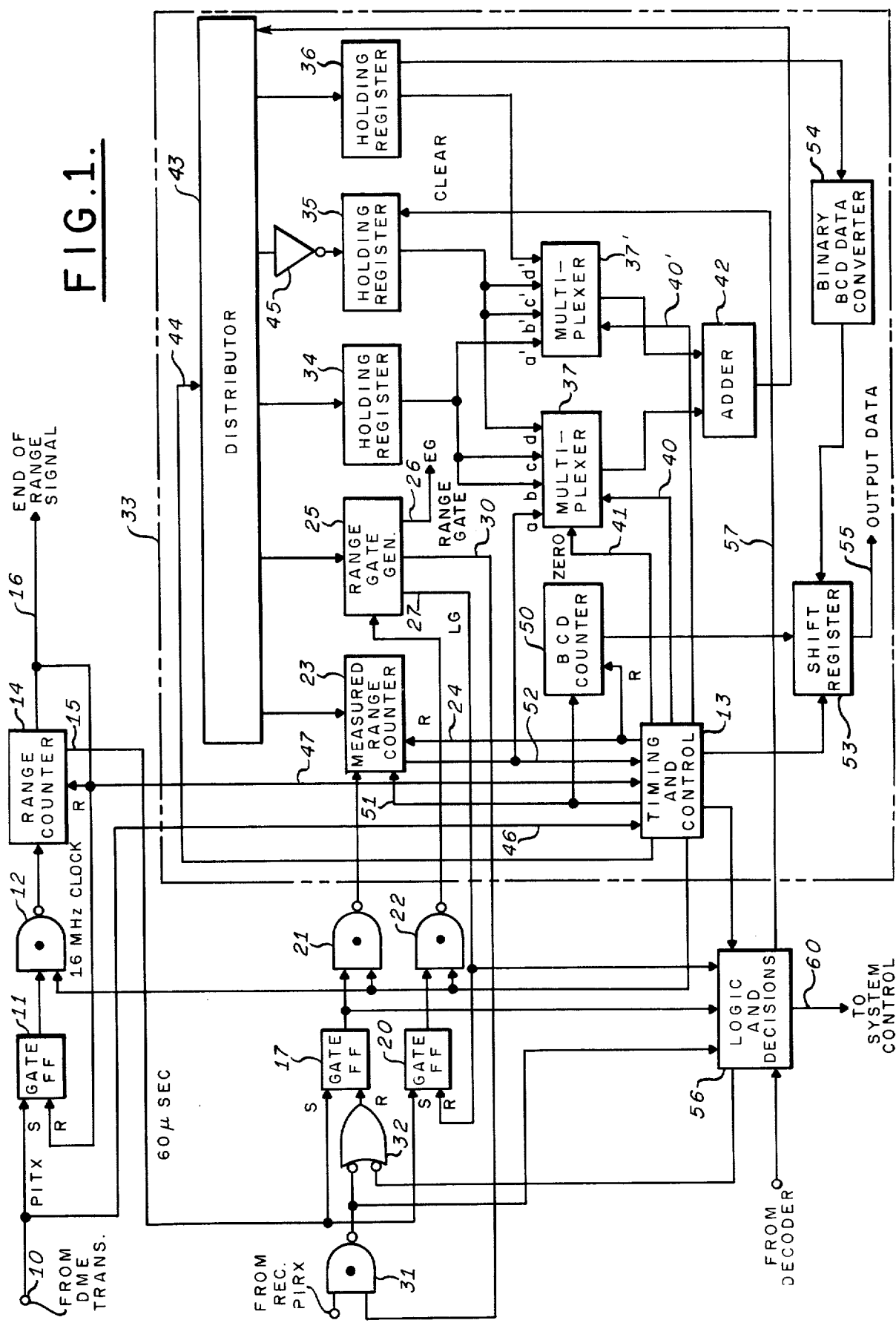
FIG. 1 is a block diagram of the preferred embodiment of the digital range tracker DME instrumented in accordance with the invention.

FIG. 1 illustrates a digital range tracker for a DME system instrumented in accordance with the invention. It will be appreciated that the system in which the apparatus of FIG. 1 is utilized includes equipment to perform the conventional DME functions, which conventional equipment is not shown for brevity. For example, the system will include a DME transmitter for generating and transmitting the P1TX and P2TX pulse pair with means for adjusting the A/G pulse pair spacing as well as the transmitter rf carrier frequency in accordance with applicable specifications, i.e., ARINC specifications and the like. The equipment will also include a DME receiver which can be tuned to receive the variety of ground-based transponder rf transmitting frequencies as delineated in the ARINC specifications. The equipment will also include an adjustable pulse pair spacing decoder to selectively receive the P1RX and P2RX pulses coded and transmitted by the ground-based transponders in accordance with the G/A pulse pair spacings of the ARINC specifications. Such a decoder is normally instrumented utilizing delay lines and coincidence gates in a well known manner.

As part of the conventional system in which the apparatus of FIG. 1 is utilized, the airborne DME will also include mode control circuits (not shown) for controlling the apparatus so as to search for, lock on to and track the return pulses corresponding to the aircraft pulse transmissions. The equipment will also include conventional decision circuits to monitor the "hits" and "misses" and apply criteria for switching between the various system modes. For example, when in the track mode, "lost track" criteria are applied to revert to a searching mode. Although numerous procedures and equipment configurations are known to search for and lock onto DME pulses and numerous decision criteria are available for system mode switching, a particular pulse acquisition procedure and mode control criteria will be described infra that are advantageously utilized with the range tracker of FIG. 1. In the following description of FIG. 1, it will be assumed that the system has acquired and locked onto a valid pulse and is tracking on the P1RX received pulses.

Referring now to FIG. 1, the P1TX transmitted pulse from the DME transmitter is applied via a terminal 10 to the set input of a gating flip-flop 11. The output of the flip-flop 11 is applied as an input to an AND gate 12, a second input of which being connected to receive a 16 MHz clock signal from timing and control circuits 13. The timing and control circuits 13 include a conventional clock pulse generator for providing the 16 MHz clock. The output of the AND gate 12 is applied as an input to a range counter 14. The range counter 14 is, for example, a 14-stage synchronous binary up counter with two outputs 15 and 16. The output 15 occurs at 60 microseconds after the counter 14 begins counting the 16 MHz clock pulses beginning at the zero count. The 60 microsecond output from the counter 14 represents the fixed transponder delay, previously discussed, between the receipt of interrogation pulses from an aircraft and the transmission of response pulses back to the aircraft. The output 16 of the counter 14 provides an "end of range" signal when the counter 14 attains a count representative of the maximum range of the DME system. The end of range signal from the output 16 is applied to the respective reset inputs of the counter 14 and the flip-flop 11. When the end of range signal occurs, the range counter 14 is reset back to the zero count and the flip-flop 11 is reset to its off state.

Upon application of a P1TX pulse at the terminal 10, the flip-flop 11 is switched on which renders the gate 12 conductive, transmitting the clock pulses to the range counter 14. The counter 14 counts the clock pulses beginning from the zero count and provides the 60 microsecond signal at the output 15 and the end of range signal at the output 16 which resets the counter back to zero and resets the slip-flop 11 rendering the gate 12 non-conductive. The count cycle for the counter 14 is repeated for each receipt of a P1TX pulse at the terminal 10. The clock frequency of 16 megahertz is precisely chosen as 16.18753 MHz which has a period of 61.7759 nanoseconds. This particular clock frequency is chosen because it provides a precise equivalent range resolution of 0.005 nautical miles.

The 60 microsecond output 15 from the range counter 14 is applied to the set inputs of gating flip-flops 17 and 20. The outputs of the flip-flops 17 and 20 are appled as inputs to AND gates 21 and 22 respectively. The 16 MHz clock signal from the timing and control circuits 13 is also applied as an input to each of the AND gates 21 and 22. The gated clock output from the AND gate 21 is applied as an input to a measured range counter 23. The counter 23 is a conventional binary ripple-through down-counter having 16 stages. The counter is configured in a conventional manner such that only the 13 most significant stages are utilized in the count-down mode. The counter 23 is further conventionally configured such that the 16 stages may be utilized as a parallel register. The counter 23 is so configured to utilize the additional three least significant stages in the tracking function to increase resolution in accordance with the invention in a manner to be described. When in the counting mode, the counter 23 operates in modulo $R_{max}$ (maximum range) fashion, the 13 most significant stages of the counter 23 having a maximum count of the DME system maximum range $R_{max}$. The counter 23 is reset by a signal from the timing and control circuit 13 on a lead 24.

The gated clock output from the AND gate 22 is applied as an input to a range gate generator 25. The range gate generator 25 comprises a conventional 16-stage binary ripple-through downcounter whose output is connected to a conventional decoder. The decoder in the range gate generator 25 is arranged in a conventional manner to provide an "early gate" pulse on a lead 26 and a "late gate" pulse on a lead 27. The early gate pulse is produced by decoding a predetermined count prior to the range gate generator counter reaching zero count and the late gate pulse is produced by decoding a count subsequent to the zero count. The range gate generator 25 also includes conventional circuits responsive to the early gate pulse and the late gate pulse to generate a range gate pulse on a lead 30 whose leading edge coincides with the leading edge of the early gate pulse and whose trailing edge coincides with the trailing edge of the late gate pulse. The predetermined counts prior to and subsequent to the zero count may be chosen symmetrically with regard to the zero count such that the zero count occurs in the center of the range gate. The predetermined decoded counts that determine the width of the range gate may be altered by conventional logic (not shown) thereby altering the range gate width.

The range gate pulse on the lead 30 is applied as an input to an AND gate 31, the other input thereto being provided by the received P1RX pulse from the DME receiver. The output of the AND gate 31 is applied through an OR gate 32 to the reset input of the gating flip-flop 17. The late gate signal on the lead 27 from the range gate generator 25 is applied to the reset terminal of the gating flip-flop 20.

In a manner to be explained infra, the range gate generator 25 is preset to the predicted range ($PR_N$) and the measured range counter 23 is reset to the zero count by a signal on the lead 24. Upon the occurrence of the 60 microsecond signal from the output 15 of the range counter 14, the gating flip-flops 17 and 20 are switched to the set state thereby enabling the AND gates 21 and 22 to transmit the 16 MHz clock signal to the measured range counter 23 and to the counter within the range gate generator 25. The two counters will count the clock pulses continuously until the receipt of a P1RX pulse in coincidence with the range gate pulse at the AND gate 31 at which time the AND gate 31 via the OR gate 32 resets the flip-flop 17 to disable the AND gate 21. Disabling the AND gate 21 blocks further transmission of clock pulses to the measured range counter 23 causing the counter to stop counting. The measured range counter 23 thereby counts the elapsed time between the P1TX and P1RX pulses less the 60 microsecond fixed transponder delay thus storing the distance between the airborne DME transmitter-receiver and the ground based transponder. The measured range counter 23 counts backwardly from zero in order to generate a binary number representative of the negative measured range ($-MR_N$) in two's complement format in a conventional manner. This procedure is utilized so as to simplify the tracking computations to be later described.

With the range gate generator 25 preset to the predicted range, the down-counting procedure permits the range gate generator counter to be at or near zero count when the P1RX pulse is anticipated. Thus the early gate and late gate decoding around zero count, as described above, generates the range gate which, if the predicted range is reasonably accurate, will result in the P1RX pulse occurring within the range gate pulse thereby stopping the measured range counter 23. If the P1RX pulse does not occur within the range gate pulse, the system will reject the measurement as being erroneous in a manner to be described. After generation of the range gate pulse on the lead 30, the late gate pulse on the lead 27 resets the gating flip-flop 20 thereby disabling the AND gate 22 thereby terminating the application of clock pulses to the counter in the range gate generator 25.

As described above the DME system determines the distance between an airborne aircraft and a fixed ground location. This is achieved by the airborne transmitter-receiver unit interrogating the ground based transponder and tracking the received corresponding transponder replies. The airborne transmitter-receiver unit is tuned on the particular ground based transponder by setting the transmitting and receiving rf frequencies as well as the G/A and A/G spacings in accordance with, for example, the ARINC specifications for the transponder. Since numerous aircraft may be interrogating the same transponder each airborne transmitter-receiver unit should include means for anticipating the time of the transponder reply to its own transmission thereby rejecting the transponder replies to the other aircraft.

As described above, the 13 most significant stages of the measured range counter 23 provides a measure of the actual range in response to a P1TX transmitted pulse. The range gate generator 25 provides a range gate pulse in accordance with the predicted range for the next P1TX transmission thus providing the required anticipation of the time of the transponder reply to own aircrafts transmitter-receiver unit. The measured range counter 23 and the range gate generator 25 as well as the timing and control circuits 13 are part of a tracker 33 that performs this prediction or anticipation function.

The tracker 33 is essentially a special purpose digital computer for solving the tracking equation that provides the predicted range at the next transmitted pulse pair. The tracking equation is $$PR_{N+1} = PR_N [+ _{K_1} \Delta R_N + K_2 \sum_0^N \Delta R$$

where $PR_{N+1}$ is the predicted range for the sample time $N+1$ computed at time $N$;

$PR_N$ is the predicted range for sample time $N$ computed at time $N-1$;

$\Delta R_N = MR_N - PR_N$;

$MR_N$ is the measured range at time $N$;

$\Delta R$ is the difference between the predicted range and the actual measured range; and $K_1$ and $K_2$ are servo loop time constants of absolute value less than unity.

As well as including the measured range counter 23, the range gate generator 25 and the timing and control circuits 13, the tracker 33 also includes three 16-stage holding registers 34, 35 and 36. The tracker 33 also includes two four-line to one-line digital multiplexes 37 and 37' where the inputs to the multiplexer 37 are designated as $a$, $b$, $c$ and $d$, and the inputs to the multiplexer 37' are designated as $a'$, $b'$, $c'$ and $d'$. The output of the measured range counter 23 is connected to the a input of the multiplexer 37. The output of the holding register 34 is connected to both the $b$ and the $c$ inputs to the multiplexer 37 as well as to the $a'$ input of the multiplexer 37'. The output of the holding register 35 is connected to the $d$ input of the multiplexer 37 and to the $b'$ and $c'$ inputs to the multiplexer 37' while the output of the holding register 36 is connected to the $d'$ input to the multiplexer 37'. The multiplexers 37 and 37' also receive control signals from the timing and control circuits 13 on leads 40 and 40' respectively to connect a selected multiplexer input to the output thereof. The multiplexer 37 also receives a signal on a lead 41 from the timing and control circuits 13 to force the output of the multiplexer 37 to be zero for reasons to be explained.

The respective outputs of the multiplexers 37 and 37' are connected as inputs to a conventional binary adder 42 whose output is connected as an input to a conventional digital distributor 43. The distributor 43 also receives a control signal on a lead 44 from the timing and control circuits 13. The distributor 43 has five outputs connected respectively to the measured range counter 23, the range gate generator 25 and the holding registers 34, 35 and 36 respectively; the output of the distributor 43 to the holding register 35 being coupled through an inverter 45. The signal on the lead 44 from the timing and control circuits 13 directs the output from the adder 42 to a selected one of the five outputs of the distributor 43 for insertion into the counter or register connected to the selected distributor output. The timing and control circuits 13 also receive inputs from the P1TX pulse at the terminal 10 on a lead 46 and the end of range signal from the output 16 of the range counter 14 on a lead 47.

The tracker 33 also includes a binary coded decimal (BCD) counter 50 with four decade stages for the tens, units, tenths and hundredths digits of the distance to be provided as an output of the system. The timing and control circuits 13 provide a clock pulse signal on a lead 51 to both the binary coded decimal counter 50 and the measured range counter 23 as well as providing the reset signal on the lead 24 to the counter 50. The measured range counter 23 also provides an input to the timing and control circuits 13 on a lead 52 to indicate when the measured range counter 23 has attained the zero count. The clock pulse signal on the lead 51 counts the measured range counter 23 in a downward direction and the binary coded decimal counter 50 in an upward direction. Thus a range expressed in binary in the counter 23 is downwardly counted to zero while the same clock pulses count the counter 50 upwardly from zero so as to convert the binary range in the counter 23 to a binary coded decimal range in the counter 50. When the counter 23 attains the zero count, the timing and control circuits 13 in response to the signal on the lead 52 stops the clock input to both the counters 23 and 50 at which time the counter 50 is storing the range in binary coded decimal format.

The output of the binary coded decimal counter 50 is applied to a shift register 53 which also receives an input from a binary to binary coded decimal data converter 54. The input to the converter 54 is provided from three of the least significant stages of the holding register 36. The shift register 53 also receives control signals from the timing and control circuits 13 for transferring the range measurement from the counter 50 into the shift register 53 with a resolution to 100th of a nautical mile. The converter 54 provides the 1,000ths digit for the binary coded decimal range measurement to provide the increased resolution in accordance with the invention in a manner to be described. The timing and control circuits 13 also control the shift register 53 to provide the output data word on a lead 55 in a manner to be explained infra.

The timing and control circuits 13 also provide a signal to a logic and decisions block 56 which receives inputs from the output of the AND gate 31, the output of the gating flip-flop 17 and the late gate signal on the lead 27. The logic and decisions block 56 also receives an input from the G/A pulse pair spacing decoder of the DME system. The logic and decisions block 56 in response to its input signals provides an input to the OR gate 32 for resetting the gating flip-flop 17 and an input on a lead 57 to the clear input of the holding register 35 for resetting the register to zero. The block 56 also provides a signal on a lead 60 for mode control purposes as well as to perform other functions in the DME system.

The logic and decisions block 56 comprises conventional circuitry for performing a variety of functions in the operation of the apparatus of FIG. 1. For example, the block 56 includes circuits to determine if a received P1RX pulse is a "hit" or a "miss." A hit is defined as a P1RX pulse occurring within the range gate pulse on the lead 30 and a valid decoding of the G/A spacing between the P1RX pulse and the P2RX pulse. The output from the AND gate 31, applied to the block 56, is indicative of the occurrence of the P1RX pulse within the range gate pulse and the input to the block 56 from the DME decoder is indicative of the validity of the G/A spacing. These two inputs to the block 56 may be combined in a conventional coincidence circuit to determine if a "hit" has occurred. The absence of either the P1RX pulse within the range gate or the absence of a valid P2RX G/A decoding is indicative that a "miss" has occurred. Conventional counting and decision circuits within the block 56 responsive to the "hit" and "miss" signal may be utilized to generate a signal on the lead 60 for controlling the operational modes of the DME system. For example, when the equipment of FIG. 1 is operating in the system tracking mode, the block 56 will provide a signal on the lead 60 to revert to the system searching mode when a predetermined number of "hits" fail to occur within a predetermined time interval.

Another function performed by the logic and decisions block 56 is to reset the gating flip-flop 17 when the P1RX pulse does not occur within the range gate pulse. Conventional logic circuits within the block 56 responsive to the set state of the gating flip-flop 17 occurring coincidentally with the late gate pulse on the lead 27 provides a signal to the OR gate 32 to reset the gating flip-flop 17. This function is performed when the system is in the tracking mode, a somewhat different function being performed in the system searching mode in a manner to be later explained. The logic and decisions block 56 also includes conventional circuits to provide a signal on the lead 57 to clear the holding register 35 when a "miss" is detected, as explained above, in conjunction with a signal from the timing and control circuits 13.

The interconnections amongst the blocks of the tracker 33 are illustrated schematically as single lines. In the preferred embodiment of the invention in which parallel data transfer is utilized, these interconnecting lines represent multi-conductor cables. For example, each of the control leads 40 and 40' to the multiplexers 37 and 37' convey two binary control signals from the timing and control circuits 13 to select one of the four inputs to each of the multiplexers 37 and 37' respectively in a conventional manner. Each of the inputs $a$, $b$, $c$ and $d$ to the multiplexer 37 as well as each of the inputs $a'$, $b'$, $c'$ and $d'$ to the multiplexer 37' comprises 16 input leads and the respective outputs from the multiplexers 37 and 37' similarly comprise 16 conductors. Thus, the control signals on the leads 40 and 40' select a group of 16 leads comprising the selected input to the multiplexer and connect these 16 leads to the 16 output leads of the multiplexer, respectively.

The adder 42 is a 16-stage parallel adder having the two inputs to each stage provided by the respective leads from the multiplexers 37 and 37' so as to effect a parallel addition of the two 16-bit numbers provided by the respective multiplexers 37 and 37'. The output of the adder 42 is a 16-conductor cable for transferring the 16-bit sum in parallel to the distributor 43. Each of the outputs of the distributor 43 also includes 16 leads which are selectively connected to the 16 conductors from the adder 42 respectively, the 16-conductor output of the distributor 43 to be connected to the input thereof being selected by the control signals on the cable 44 in a conventional manner.

As previously discussed, the five 16-conductor outputs from the distributor 43 are coupled respectively to the measured range counter 23, the range gate generator 25 and the holding registers 34–36, the coupling between the distributor 43 output and the holding register 35 being effected through an inverter 45. It will be appreciated that each of the 16 conductors for each of the outputs of the distributor 43 are connected in parallel to the 16 stages of the respective counter or register for parallel loading thereof, the inverter 45 being schematically representative of 16 inverting circuits for inverting each of the 16 bits as they are transferred from the distributor 43 to the register 35.

As previously explained, the outputs of the measured range counter 23 and the registers 34–36 are connected to the associated inputs of the multiplexers 37 and 37'. Each of the outputs of the counter 23 and the registers 34–36 is a 16-conductor cable for transmitting the 16-bit contents of each counter or register in parallel to the associated 16 lead input or inputs to the multiplexers. The arrangement of the 16 binary digits transmitted from the counter 23 or the registers 34–36 through the multiplexer and into the adder 42 may be preserved. For example, the least significant stage from the measured range counter 23 may be connected to the first of the 16 leads of input a to the multiplexer 37, and when the input a is connected to the output of the multiplexer 37, this first lead of input a will be connected to the first of the 16 leads of the multiplexer 37 output. In a similar manner, the most significant digit from the counter 23 may be connected to the 16th lead of input a and hence to the 16th lead of the multiplexer 37 output. The intermediate digits from the counter 23 will be connected through correspondingly numbered leads of the input a to the multiplexer 37 and thence to the correspondingly numbered lead of the output thereof. Thus it is appreciated that the arrangement of the digits in the word transferred from the counter 23 through the multiplexer 37 and hence to the adder 42 is preserved.

In a similar manner, the 16 bit binary word from the register 34 is transferred in parallel through the input b of the multiplexer 37 to the adder 42 without altering the word from the register 34. Similarly, the binary words from the registers 35 and 36 are transferred unaltered through the inputs c' and d' of the multiplexer 37' respectively.

The output of the register 34 is wired to the input c of the multiplexer 37 and to the input a' of the multiplexer 37' so as to effect a shift of the binary words transferred through the multiplexers. In a similar manner, the output of the register 35 is connected to the input d of the multiplexer 37 and the input b' of the multiplexer 37' so as to effect a shift of the transferred word. This shifting operation is achieved by offsetting the connection of the 16 output leads from the associated register with respect to the connection to the 16 input leads of the associated input of the multiplexer. For example, if it is desired to effect a shift of the word one bit to the right, the lead connected to the least significant stage of the register would not be connected to the multiplexer and the leads 2 through 16 from the register would be connected to the leads 1–15 of the input to the multiplexer, the 16th lead of the input to the multiplexer having a signal representative of zero applied thereto. Thus by offsetting the connections in this manner, a shift of any number of positions, for example to the right, may be effected in the transfer of the binary word from a register through a multiplexer. This hard-wiring procedure is utilized to conveniently compute the time constants of the tracking equation instrumented by the tracker 33 in a manner to be explained.

The tracker 33 is utilized to recursively solve the tracking equation given above. The timing and control circuits 13 effectively comprise a programmer for sequencing the tracker 33 through a series of steps in order to solve the equation.

In operation assume that the N−1 pulse transmission interval has occurred leaving the range counter 14 and the measured range counter 23 reset to zero, the range gate generator 25 and the holding register 36 storing the predicted range $PR_N$ for the Nth pulse transmission interval, the shift register 53 storing this predicted range in binary coded decimal format and the register 34 containing the accumulated sum of past range errors $$\sum_{0}^{N-1} \Delta R_i$$

It will be furthermore assumed that the DME system is in the tracking mode and that the return pulses are generally occurring within the range gate.

During the Nth pulse transmission interval, the airborne DME unit transmits the P1TX and P2TX pulse pair, the P1TX transmitted pulse being applied to the terminal 10 and via the conductor 46 to the timing and control circuits 13 to cause the shift register 53 to shift out the predicted range for the Nth interval on the lead 55 to provide the output data for the system. As previously explained, the P1TX pulse at the terminal 10 causes the AND gate 12 to be enabled thus gating the 16 MHz clock to the range counter 14. Sixty microseconds thereafter, the range counter 14 provides the signal at its output 15 setting the gating flip-flops 17 and 20, thereby enabling the AND gates 21 and 22 to gate the 16 MHz clock to the measured range counter 23 and the range gate generator 25. Since the predicted range for the Nth pulse transmission interval was stored in the range gate generator 25, the range gate pulse on the lead 30 will be generated in accordance with the expected arrival time of the P1RX pulse from the transponder. When the range gate generator 25 has counted down from the predicted range so as to generate the range gate pulse as previously explained, the AND gate 31 is enabled awaiting receipt of the P1RX pulse. When the P1RX pulse arrives within the range gate pulse, the signal through the AND gate 31 resets the flip-flop 17 to stop the measured range counter 23 at the arrival time of the P1RX pulse. The range gate generator 25 continues counting until the late gate pulse is generated on the lead 27 thereby resetting the gating flip-flop 20 and stopping the range gate generator 25. During this time, the range counter 14 is continuing to count until it attains its maximum end of range count at which time the end of range signal is generated at the output 16 thereof. The "end of range" signal resets the range counter 14 and the gating flip-flop 11 and signals the timing and control circuits 13 to begin processing the range $MR_N$ measured in this Nth pulse transmission interval that is now stored in the measured range counter 23.

Upon receipt of the "end of range" signal, the timing and control circuits 13 control the tracker 33 to perform the following sequence of steps so as to compute the above-given tracking equation.

Step One: With the measured range counter 23 containing the range $MR_N$, measured at time interval N and the holding register 36 containing the range $PR_N$, predicted for the interval N and computed during the previous interval N—1, the timing and control circuits 13 apply signals to the leads 40 and 40' so as to connect the a input of the multiplexer 37 to its output and the $d'$ input of the multiplexer 37' to its output thereby connecting the measured range counter 23 and the holding register 36 to the adder 42. The timing and control circuits 13 also control the distributor 43 via the cable 44 so as to connect the output of the adder 42 of the input of the holding register 35 via the inverter 45. Thus the outputs of the measured range counter 23 and the holding register 36 are added and the inverted sum stored in the holding register 35, i.e., $$PR_N + MR_N = -\Delta R_N$$

where $-R_N$ is the difference between the predicted range and the actual measured range. As previously described, the number stored in the measured range counter 23 is actually the negative two's complement of $MR_N$, thus the addition operation provides the difference in a well known manner. The difference $-\Delta R_N$ is transmitted from the adder 42 through the distributor 43 and inverted in the inverter 45 to store the range error $\Delta R_N$ in the holding register 35.

As previously discussed, when the measured range in the counter 23 represents invalid data, the logic and decisions block 56 provides a signal on the lead 57 to reset the holding register 35 to zero thus clearing out the invalid $\Delta R$. $\Delta R$ may be invalid when either the received P1RX pulse does not occur within the range gate, or the G/A coded pulse spacing between P1RX and P2RX is not validated by the G/A spacing decoder. These conditions are representative of a "miss" as previously discussed. The clearing of the register 35 occurs prior to Step 2 under control of the lead from the timing and control circuits 13 to the logic and decisions block 56.

Step 2: As previously described, the holding register 34 contains the accumulated sum $$\sum_{0}^{N-1} \Delta R$$

of the past range errors. During Step 2, the timing and control circuits 13 control the multiplexer 37 to connect its $b$ input to the output thereof, the multiplexer 37' to connect its $c'$ input to the output thereof, and the distributor 43 to connect the output of the adder 42 to the holding register 34. Thus, during Step 2, the contents of the registers 34 and 35 are added and the sum stored back into the register 34, hence performing the following operation:

$$\Delta R_N + \sum_{0}^{N-1} \Delta R = \sum_{0}^{N} \Delta R$$

Thus the quantity $$\sum_{0}^{N} \Delta R$$

is now stored in the register 34.

Step 3: Step 3 is utilized to provide the coefficient $K_1$ and to generate the term $K_1 \Delta R$ of the above given tracking equation where $K_1$ is the time constant determining the passband of the tracking servo instrumented in accordance with the equation. The $K_1$ coefficient is always less than unity and is constrained to be a binary multiple. Thus the product of $K_1$ and $\Delta R$ may be formed by right shifting the $\Delta R$ quantity a predetermined number of positions. For example, a one-bit shift will multiply $\Delta R$ by ½, a two-bit shift by ¼, etc. Thus the right shifting operation multiplies $\Delta R$ by any predetermined binary fraction determined by the number of positions shifted. To provide the servo designer with even greater flexibility, the coefficient $K_1$ may be the sum of any two binary fractions thus permitting the designer to more ideally optimize the second order recursive tracking servo. For example, $K_1$ may be ½ + 1/32 = 5/32.

To compute the $K_1 \Delta R$ term of the tracker equation, the timing and control circuits 13 control the multiplexer 37 to connect its $d$ input to its output, the multiplexer 37' to connect its $b'$ input to its output and the distributor 43 to connect the output of the adder 42 to the measured range counter 23. Thus the output $\Delta R_N$ of the register 35 is transmitted to the adder 42 via both of the multiplexers 37 and 37', each multiplexer right shifting the quantity $\Delta R_N$ by a predetermined number of bits by means of the input wiring to the multiplexers as previously described. The following computation is therefore performed:

$$C_1 \Delta R_N + C_2 \Delta R_N = K_1 \Delta R_N$$

where $C_1$ and $C_2$ are binary fractions of one-half, one-quarter, one eighth, etc. determined by the wiring, where $C_1$ or $C_2$ may also be zero. Thus it is appreciated that by the relatively simple and inexpensive implementation described, the servo loop time constant $K_1$ may take on a wide range of values for controlling the characteristics of the second order recursive tracker servo. The Step 3 output of the adder 42 ($K_1 \Delta R_N$) is stored in the measured range counter 23. As previously described, the down-counting function of the measured range counter 23 is effected by the 13 most significant bits of the 16-bit counter. It is appreciated that the additional three bits in this counter-register 23 is required to store the additional bits of resolution created by the shifting of $\Delta R_N$ which additional resolution is achieved in accordance with the concepts of the invention in a manner to be later discussed.

Step 4: During Step 4, the timing and control circuits 13 control the multiplexer 37 to connect its a input to its output, the multiplexer 37' to connect its $d'$ input to its output, and the distributor 43 to connect the output of the adder 42 to the register 36. Thus the outputs of the measured range counter 23 is added to the output of the register 36 with the sum being stored in register 36 thereby performing the computation:

$$PR_n + K_1 \Delta R_N$$

which is stored in the register 36.

Step 5: Step 5 is utilized to provide the servo loop time constant $K_2$ and to generate the term $$K_2 \sum_0^N \Delta R$$

of the tracking equation. The constant $K_2$ is provided in a manner similar to that described above in Step 3 and it will be appreciated that the constant $K_2$ is not restricted to being the same value as $K_1$. The $K_2$ time constant determines the damping of the second order recursive tracking servo. During Step 5, the timing and control circuits 13 control the multiplexer 37 to connect its $c$ input to its output, the multiplexer 37' to connect its $a'$ input to its output and the distributor 43 to connect the output of the adder 42 to the measured range counter 23. Thus the term $$K_2 \sum_0^N \Delta R$$

is computed as explained above in Step 3 and stored in the measured range counter 23. It will be appreciated that in the manner described in Step 3, three additional bits of resolution are again provided by the shifting operation in forming this sum of range error term. The averaging effect of accumulating the range errors and multiplying by the $K_2$ constant, accurately provides greater resolution than could be obtained using conventional techniques from the 16 MHz system clock in a manner to be later explained.

Step 6: In Step 6, the timing and control circuits 13 control the multiplexer 37 to connect its a input to its output, the multiplexer 37' to connect its $d'$ input to its output and the distributor 43 to connect the output of the adder 42 to both the holding register 36 and the range gate generator 25. Thus in Step 6, the sum of the contents of the register 36 and the measured range counter 23 is stored back into the register 36 as well as into the range gate generator 25. The following operation is performed;

$$K_2 \sum_0^N \Delta R + PR_N + K_1 \Delta R_N = PR_{N+1}$$

Thus the predicted range from the pulse transmission interval N added to $$K_1 \Delta R_N + K_2 \sum_0^N \Delta R$$

forms the predicted range for the pulse transmission interval N+1 which is stored in the holding register 36. The predicted range for the interval N+1 is also stored in the range gate generator 25 for generation of the range gate pulse for the next following pulse transmission interval in the manner described above.

Step 7: In Step 7, the timing and control circuits 13 apply a signal to the lead 41 to force the output of the multiplexer 37 to be zero, controls the multiplexer 37' to connect its $d'$ input to its output and controls the distributor 43 to connect the output of the adder 42 to the measured range counter 23. Thus, in Step 7, the adder 42 is used merely to insert the quantity $PR_{N+1}$ into the measured range counter 23.

Step 8: During this step, the timing and control circuits 13 provide a clock signal, which, for example, may be approximately 2 MHz on the lead 51 to the measured range counter 23 and to the binary coded decimal counter 50. The measured range counter 23 is down-counted while the BCD counter 50 is up counted from zero until the measured range counter 23 attains the zero count as indicated to the timing and control circuits 13 by a signal on the lead 52. Thus the predicted range $PR_{N+1}$ is converted from its binary format in the counter 23 to a binary coded decimal format in the counter 50, which counter now contains $PR_{N+1}$ in BCD format to a resolution of 0.005 nautical miles.

Step 9: During step 9, the timing and control circuits 13 load the $PR_{N+1}$ BCD data from the counter 50 in parallel into the shift register 53. The counter 50 provides the 10's, units, 10ths and 100ths BCD data of the predicted range for the N+1 interval. Three of the least significant stages of the holding register 36 via the binary to BCD converter 54 provides the 1000ths digit of the range data word to the shift register 53. During Step 9 the timing and control circuits 13 clear the counters 23 and 50 via a signal on the lead 24.

Step 10: Step 10 is a quiescent state in which the timing and control circuits 13 remain until the initiation of the next computation cycle. Upon the occurrence of the next following P1TX pulse, the timing and control circuits 13 shifts out the predicted range data onto the line 55 at the time for which the prediction was generated. At the occurrence of the next following "end of range" signal from the range counter 14, the timing and control circuits 13 leave step 10 returning to step 1 to repeat the above delineated computations.

It will be appreciated from the foregoing that the operations of Steps 3 and 5 are utilized to effectively shift the associated binary numbers to the right thereby multiplying the numbers by binary fractions. The hard wiring technique described effects the shift, thereby eliminating equipment such as shift registers. It will, however, be appreciated that such operations could be performed, for example, by shift register apparatus to the same effect.

The above equipment described with respect to FIG. 1 comprises a special purpose digital computer for performing the computations of the above tracking equation. It is appreciated that a general purpose digital computer could readily be programmed to solve the tracking equation utilizing software rather than the above-described hardware to practice the invention.

In the above described embodiment of the invention, the apparatus of FIG. 1 comprises range predicting apparatus to provide digital predicted range signals. The range predicting apparatus of FIG. 1 includes range gate generating means for generating range gate pulses in accordance with the predicted ranges at the expected times of receipt of the return pulses, respectively, from the transponder. The range gate generating means includes the source of 16 MHz clock pulses as well as gating means coupled to receive the clock pulses and the transmitted pulses at the terminal 10 for initiating conduction of the clock pulses through the gating means in accordance with the occurrences of the transmitted pulses. This gating means associated with the range gate generating means includes delay means coupled to receive the transmitted pulses at the terminal 10 for delaying the initiation of conduction of the clock pulses through the gating means for a time delay interval in accordance with the fixed time delay of the transponder. The delay means is instrumented in the preferred embodiment by a first gating circuit comprising the gating flip-flop 11 and the AND gate 12 coupled to receive the transmitted pulses at the terminal 10 and the 16 MHz clock pulses for initiating conduction through the AND gate 12 upon the occurrences of the transmitted pulses, respectively. The delay means also includes the pulse counter 14 for counting the clock pulses conducted through the AND gate 12, the counter 14 having the output 15 connected thereto in such a manner that delayed pulses are provided at the output 15 in response to counting the clock pulses, delayed from the times of occurrences of the transmitted pulses at the terminal 10 by the 60 microsecond time delay interval, respectively. The gating means associated with the range gate generating means further comprises a second gating circuit including the flip-flop 20 and the AND gate 22 coupled to receive the delayed pulses from the output 15 of the counter 14 and the 16 MHz clock pulses for initiating conduction of the clock pulses through the AND gate 22 upon the occurrences of the delayed pulses, respectively.

The range gate generating means also includes the range gate generating pulse counting means 25 which is preset with the digital predicted range signals. The presetting means includes the blocks 13, 23, 34–37, 37', 42 and 43 for computing the predicted range signals, as described above, for presetting the range gate generating pulse counting means 25.

The range predicting apparatus of FIG. 1 further includes range measuring means for measuring the transit times between the transmitted pulses and the corresponding return pulses that coincide with the range gate pulses to provide digital measured range signals, respectively. The range measuring means includes the source of 16 MHz clock pulses described above with regard to the range gate generating means as well as gating means that includes the delay means described above with regard to the range gate generating means. The gating means for the range measuring means further includes the AND gate 31 coupled to receive the range gate pulses on the lead 30 and the return pulses for providing coincidence signals in accordance with the coincidences therebetween, respectively. This gating means associated with the range measuring means includes a gating circuit comprising the gating flip-flop 17 and the AND gate 21 coupled to receive the delayed pulses from the output 15 of the counter 14, the coincidence signals from the AND gate 31 and the 16 MHz clock pulses for initiating conduction of the clock pulses through the AND gate 21 upon the occurrences of the delayed pulses and for terminating conduction of the clock pulses upon the occurrences of the coincidence pulses from the AND gate 31. The range measuring means further includes the measured range pulse counting means 23 coupled to the AND gate 21 for counting the clock pulses conducted therethrough thereby providing the digital measured range signals.

The range predicting apparatus of FIG. 1 further includes subtracting means, accumulating means, first and second multiplying means and summing means for computing the above given tracking equation. These means in combination with the measured range counter 23 are instrumented to perform the above delineated computing steps and are defined by the blocks 13, 34–37, 37', 42 and 43 which are sequentially controlled by the timing and control circuits in the manner described above.

A significant aspect of the present invention is the increase of range resolution obtainable without utilizing a very high clock frequency. The 16 MHz system clock results in a resolution of 0.005 nautical miles when straight forward approaches are utilized but provides a resolution of 0.001 nautical miles with the present invention, 0.001 nautical miles conventionally requiring a 80 MHz clock. The increased resolution with the lower clock frequency is accurately achieved by utilizing the averaging effect when accumulating the $\Sigma \Delta R$'s and the multiplying effect when shifting. As previously discussed with regard to Steps 3 and 5, three additional significant bits of resolution in the holding register 36 representing 0.0025, 0.00125 and 0.000625 nautical miles are obtained.

The lead from the holding register 36 to the binary coded decimal converter 54 is schematically representative of a three-conductor cable connected to the stages of the register 36 of significance 0.005, 0.0025 and 0.00125 nautical miles, respectively, the data from the 0.000625 nautical mile stage being truncated. The lead from the converter 54 to the shift register 53 is schematically representative of a four-conductor cable conveying the four-bits of the 1,000ths digit of the BCD range data. The converter 54 comprises a conventional circuit foor converting the data in accordance with the following truth table:

| BINARY FROM REG. 36(NM) | | | Thousand Digit Decoding BCD (NM) | | | | DECIMAL (NM) |
|---|---|---|---|---|---|---|---|
| 0.005 | 0.0025 | 0.00125 | 0.008 | 0.004 | 0.002 | 0.001 | |
| 0 | 0 | 0 | 0 | 0 | 0 | 0 | 0.000 |
| 0 | 0 | 1 | 0 | 0 | 0 | 1 | 0.001 |
| 0 | 0 | 1 | 0 | 0 | 1 | 1 | 0.003 |
| 0 | 1 | 0 | 0 | 0 | 1 | 0 | 0.004 |
| 0 | 1 | 1 | 0 | 1 | 0 | 0 | 0.005 |
| 1 | 0 | 0 | 0 | 1 | 1 | 0 | 0.006 |
| 1 | 0 | 1 | 0 | 1 | 1 | 0 | 0.008 |
| 1 | 1 | 0 | 1 | 0 | 0 | 0 | 0.008 |
| 1 | 1 | 1 | 1 | 0 | 0 | 1 | 0.009 |

Converters for performing this function such as diode code translators are well known in the art.

Thus it is appreciated, that the output data from the shift register 53 will be provided with a resolution of 0.001 nautical miles. From the above, it is appreciated that the tracker 33 is a second order recursive servo utilized to predict the range at the next transmitted pulse pair. The shifting and averaging of the range errors provides increased resolution over that obtainable from the system clock frequency utilized. The servo will continue to track the valid transponder responses as long as a "lost track" criterion is not fulfilled. Since the servo is of second order, the tracking loop exhibits zero velocity error with regard to the relative velocity between the aircraft and the ground based transponder.

In the foregoing description, it was assumed that the tracker 33 was locked onto and tracking the true P1RX transponder responses to own aircraft's transmissions. As previously discussed, numerous procedures are known in the art to search for and lock onto the true transponder responses. In the DME system in which the apparatus of FIG. 1 is utilized, a preferred acquisition technique is advantageously employed.

Figure 2:
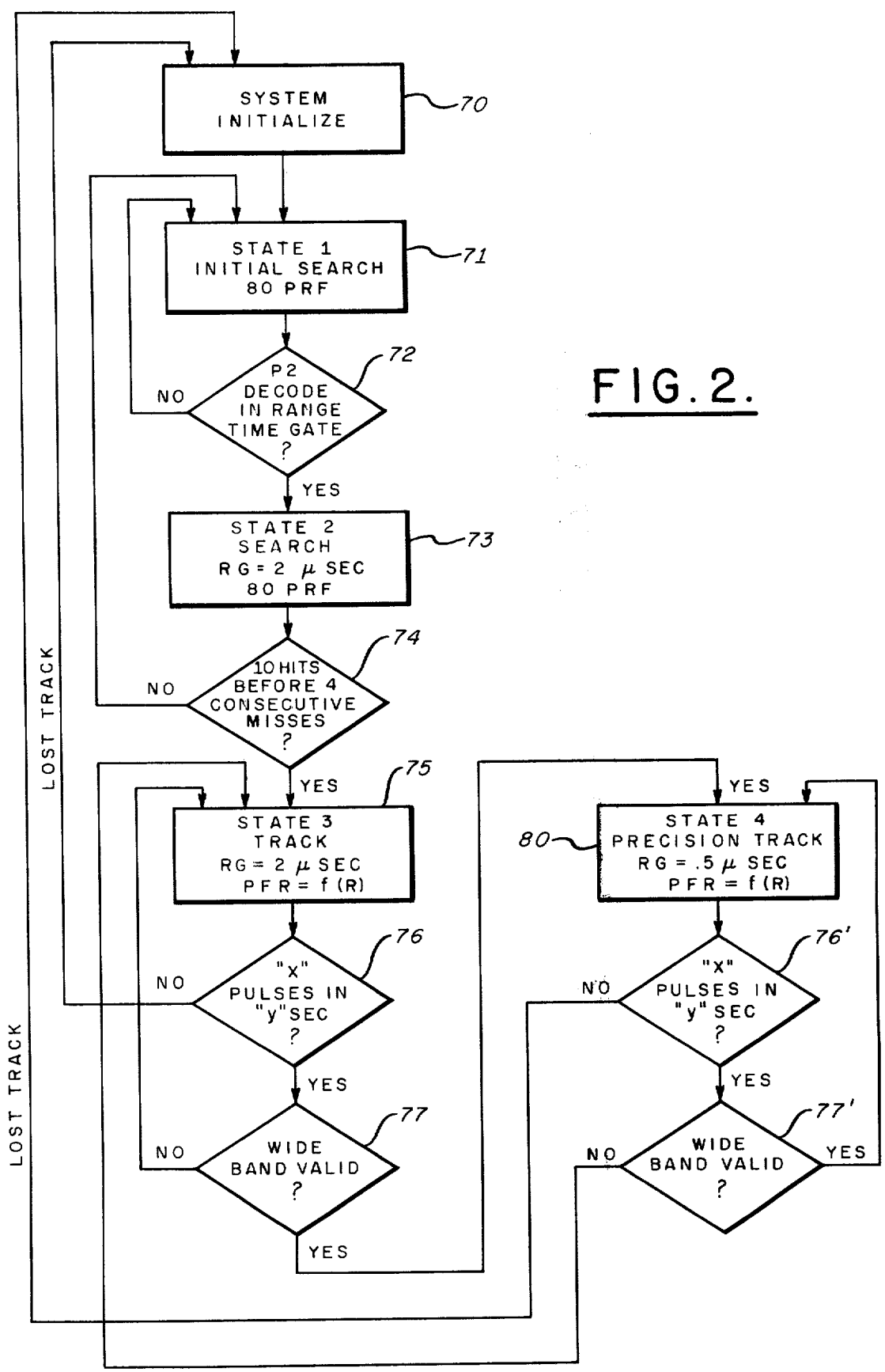
FIG. 2 is a state logic diagram useful in explaining various modes in which the apparatus of FIG. 1 may be operated.
Figure 3:
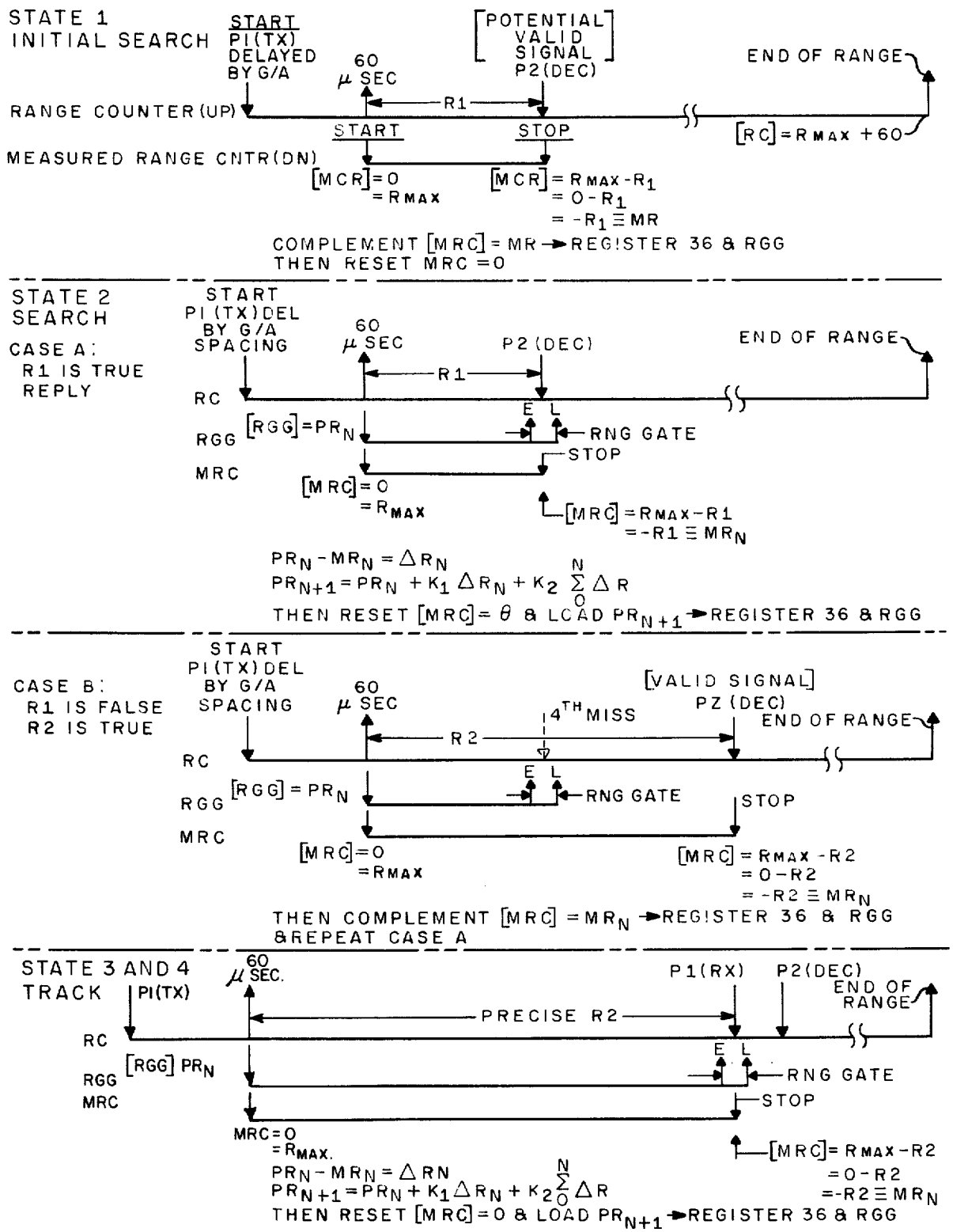
FIG. 3 is a state definition timing diagram useful in explaining the operation of the apparatus of FIG. 1.

Referring now to FIG. 2, a logic flow diagram for the various operating states of the system is illustrated and referring also to FIG. 3 a state definition timing diagram illustrating the various operating states is illustrated.

It will be appreciated in the discussion to follow that the apparatus and connections to control the circuits of FIG. 1 to operate in the various system modes are not shown in their entirety since such apparatus and connections are of conventional design of a type well known to practitioners in the DME art. Block 70 of FIG. 2 represents the system initialization procedure, wherein the range counter 14 and the measured range counter 23 are set to zero, the contents of the remaining counters and registers being initially indeterminate. The DME system transmitting and receiving frequencies as well as the G/A and A/G decoders are set to the parameters of the interrogated transponder in accordance with, for example, ARINC specifications as discussed above.

During the searching modes of the system the P2RX pulse is utilized for convenience in controlling the operations, and the system timing is offset by the G/A spacing in a manner to be clarified.

After the system is initialized in accordance with the block 70 of FIG. 2, the operation proceeds to initial search block 71 which is designated as state 1 of the system. The timing for state 1 is illustrated in FIG. 3. In state 1, the pulse repetition frequency (PRF) of the DME transmitter is set to 80 pulse pairs per second. In the following discussion, the apparatus of FIG. 1 in comination with the remainder of the DME system (not shown) is operated in accordance with the states of FIG. 2 and the timing of FIG. 3. The first transmitted P1TX pulse (delayed by the G/A spacing) energizes the gating flip-flop 11 to gate the 16 MHz clock pulses to the range counter 14. Upon the occurrence of the 60 microsecond signal from the output 15 of the range counter 14, the 16 MHz clock is gated into the measured range counter 23 which starts counting downwardly. At this time the system is merely looking for the receipt of a pulse pair with the proper G/A spacing which will be detected by the P2RX decoder. This operation is represented by decision block 72 of FIG. 2. If a valid P2 decode does not occur prior to the range counter 14 reaching its end of range state, the system remains in the initial search state 1 of block 71. If, however, a valid P2 decode does occur in the state 1 operating mode of the system, circuits within the logic and decisions block 56 stops the measured range counter 23 via a signal through the OR gate 32. This potentially valid range measurement is complemented in a conventional manner by means not shown, (since it is in negative 2's complement format) and inserted into the range gate generator 25 via the multiplexer 37, the adder 42 and the distributor 43 in a manner similar to that previously described. As indicated by the decision block 72, when a valid P2 decode occurs within the maximum operating range of the system, the apparatus proceeds to the state 2 search mode as indicated by block 73 of FIG. 2.

In the state 2 search mode of the system, the pulse repetition frequency is set at 80 pulse pairs per second and the range gate generator 25 is set to provide a 2 microsecond wide range gate pulse in the manner previously described. In state 2, the system utilizes the delayed timing in accordance with the G/A spacing as illustrated in FIG. 3 so as to perform the required operations upon the P2RX pulse for convenience and simplicity of instrumentation. In the state 2 mode, the tracker 33 is operating to provide the predicted ranges in accordance with the tracking equation computations described above. At the same time, the logic and decisions block 56 is counting the number of "hits" and "misses" where, in state 2, a "hit" is defined as a valid P2 decode and the P2RX pulse within the range gate. As indicated by block 74 of FIG. 2, if 10 "hits" occur before the occurrence of 4 consecutive "misses," the system proceeds to the state 3 tracking mode as indicated by block 75. If, however, four consecutive "misses" occur before 10 "hits," the system reverts back to the state 1 initial search block 71. As indicated by FIG. 3 for the state 2 timing, when the fourth consecutive "miss" occurs and the system reverts back to state 1, the measured range counter 23 is permitted to count past the point where the fourth "miss" occurred until the next valid P2 decode occurs, at which time a new range will be measured. This procedure continues until the system either enters the state 3 track block 75 or the range counter 14 indicates the end of maximum operating range has occurred under which condition the system will revert back to the initializing block 70.

When the system enters the state 3 track block 75, the range gate pulse is set to a width of 2 microseconds, as described above, and the system pulse pair repetition frequency is adjusted as a function of the range. For example, when the range is between 0 and 5 nautical miles, 80 pulse pairs per second are transmitted; when the range is between 5 and 10 nautical miles, 20 pulse pairs per second are transmitted; and when the range is between 10 and 40 nautical miles, 5 pulse pairs per second are transmitted. This procedure for increasing the PRF for shorter ranges increases the validity of the data. In a state 3 tracking mode of block 75 of FIG. 2, the system of FIG. 1 operates in the manner described in detail above, operating on the P1RX pulses with the G/A timing delay offset utilized during the search mode removed as indicated by the timing diagrams of FIG. 3. The system utilizes the P1RX pulses during the track modes for reasons of accuracy.

The system reverts from the state 3 track mode back to the system initialize block 70 if a "lost track" criterion is not fulfilled as indicated in block 76. The $x$ and $y$ values are functions of the range in accordance with the following table:

| RANGE | PRF | x | y |
|---|---|---|---|
| 0 ≤ R ≤ 5 | 80 | 8 | 0.5 |
| 5 ≤ R ≤ 10 | 20 | 15 | 10 |
| 10 ≤ R ≤ 40 | 5 | 5 | 10 |

If the criterion of the block 76 is fulfilled, the system proceeds to a block 77 decision which determines whether wideband or narrowband processing is required in accordance with measured signal strength. Under conditions of weak signal strength, the wideband valid block 77 causes the system to operate in the state 3 tracking mode described. If, however, adequate signal strength is indicated, the system proceeds to a block 80 representative of the state 4 precision track mode of operation. The state 4 tracking operations are the same as those described above with regard to state 3 except that a 0.5 microsecond range gate pulse is utilized to provide exceedingly precise range data. In state 4, decision blocks 76', 77' similar to those described above with regard to state 3 are utilized which correspond to the blocks 76 and 77 respectively. In accordance with the block 76', if the rate of valid pulse reception is insufficient, a "lost track" signal reinitializes the system to the block 70. The wideband valid test in accordance with the system signal strength is performed as indicated by block 77'. If there is sufficient signal strength, the system remains in the precision track state 4 operating mode but if there is insufficient signal strength, the system reverts back to the state 3 tracking mode which utilizes the wider range gate pulse.

The present invention has been described in terms of a standard DME system with a ground based transponder that is interrogated by pulses from airborne equipment and which responds to these interrogations by return pulses with a fixed time delay between receipt and retransmission of the pulses. It will be appreciated that the invention is also applicable generally to pulse tracking radar systems where a pulse is transmitted and passively reflected from an object to provide range information. It is furthermore appreciated that the present invention is applicable in systems utilizing active transponders where a delay is not introduced between receipt and retransmission of the pulses. In such systems, gating and counting circuitry such as the components 11, 12 and 14 of FIG. 1 may not be required.

The above embodiment of the invention was described in terms of a 60 microsecond transponder retransmission delay which is compensated by the output 15 from the range counter 14 of FIG. 1. It is known in DME systems that applicable specifications such as the ARINC specifications prescribe this delay for the airborne equipment. When it is desired, however, to measure the range to a point offset from the ground based transponder. such as in a DME instrument landing system, the re-transmission delay for the ground based transponder is adjusted such that the airborne equipment provides the range to the offset location in a manner known in the art.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a digital pulse tracker ranging system having a transmitter-receiver for transmitting pulses to an object and receiving corresponding return pulses from said object, respectively, said system including apparatus for predicting the ranges from said transmitter-receiver with respect to said object for said transmitted pulses to provide digital predicted range signals, respectively, said range predicting apparatus comprising range gate generating means for generating range gate pulses in accordance with said predicted ranges at the expected times of receipt of said return pulses, respectively, range measuring means for measuring the transit times between said transmitted pulses and said corresponding return pulses that coincide with said range gate pulses to provide digital measured range signals, respectively, subtracting means for obtaining the differences between said digital measured range signals and said digital predicted range signals to provide digital range error signals, respectively, accumulating means for algebraically accumulating said digital range error signals to provide the algebraic sum thereof, first multiplying means for multiplying the latest generated of said digital range error signals by a first number of absolute value less than unity to provide additional digits of resolution thereby providing a current range error signal, second multiplying means for multiplying said accumulated sum of said digital range error signals by a second number of absolute value less than unity to provide additional digits of resolution thereby providing an accumulated range error signal, and summing means for obtaining the algebraic sum of the latest of said predicted range signals, said current range error signal and said accumulated range error signal to provide the next of said predicted range signals.

2. In the system of claim 1 in which said range measuring means comprises a source of clock pulses, gating means coupled to receive said clock pulses, said range gate pulses, said transmitted pulses and said return pulses for initiating conduction therethrough of said clock pulses in accordance with the occurrences of said transmitted pulses and for terminating conduction of said clock pulses in accordance with the coincidental occurrences of said range gate pulses and the receipts of said return pulses, respectively, and measured range pulse counting means coupled to said gating means for counting said clock pulses conducting therethrough, thereby providing said digital measured range signals.

3. In the system of claim 2 in which said object comprises a fixed location transponder for transmitting said return pulses to said transmitter-receiver in response to receipts of said transmitted pulses from said transmitter-receiver, respectively, after a predetermined time delay therebetween.

4. In the system of claim 3 in which said gating means includes delay means coupled to receive said transmitted pulses for delaying said initiation of conduction of said clock pulses for a time delay interval in accordance with said predetermined time delay of said transponder.

5. In the system of claim 4 in which said delay means comprises
a first gating circuit coupled to receive said transmitted pulses and said clock pulses for initiating conduction therethrough of said clock pulses upon the occurrences of said transmitted pulses, respectively, and
a first pulse counter coupled to said first gating circuit for counting said clock pulses conducted therethrough, said first pulse counter having a first output connected thereto in such a manner that delayed pulses are provided at said first output in response to counting said clock pulses, delayed from the times of occurrence of said transmitted pulses by said time delay interval, respectively.

6. In the system of claim 5 in which said gating means further comprises
an AND gat coupled to receive said range gate pulses and said return pulses for providing coincidence signals in accordance with the coincidences therebetween, respectively, and
a second gating circuit coupled to receive said delayed pulses, said coincidence signals and said clock pulses for initiating conduction therethrough of said clock pulses upon the occurrences of said delayed pulses and for terminating conduction of said clock pulses upon the occurrences of said coincidence signals, respectively.

7. In the system of claim 5 in which said first gating circuit comprises
a gating flip-flop having a set input coupled to receive said transmitted pulses, and
an AND gate coupled to receive the output of said gating flip-flop and said clock pulses and having an output coupled to said first pulse counter for conducting said clock pulses to said first pulse counter in accordance with said output of said flip-flop.

8. In the system of claim 7 in which
said first pulse counter has a second output representative of the end of range of said system, and
said gating flip-flop has a reset input coupled to said second output of said first pulse counter.

9. In the system of claim 6 in which said second gating circuit comprises
a gating flip-flop having a set input coupled to receive said delayed pulses and a reset input coupled to receive said coincidence signals, and
an AND gate coupled to receive the output of said gating flip-flop and said clock pulses and having an output coupled to said measured range pulse counting means for conducting said clock pulses to said measured range pulse counting means in accordance with said output of said flip-flop.

10. In the system of claim 2 in which said measured range pulse counting means comprises a binary down-counter for counting said clock pulses conducted through said gating means in a backward direction from zero thereby providing said digital measured range signals in two's complement format.

11. In the system of claim 1 in which said range gate generating means comprises
a source of clock pulses,
gating means coupled to receive said clock pulses and said transmitted pulses for initiating conduction therethrough of said clock pulses in accordance with the occurrences of said transmitted pulses, respectively,
range gate generating pulse counting means, and
presetting means for presetting said range gate generating pulse counting means with said digital predicted range signals,
said range gate generating pulse counting means being coupled to said gating means for counting said clock pulses conducted therethrough with respect to said predicted ranges, thereby providing said range gate pulses, respectively.

12. In the system of claim 11 in which said object comprises a fixed location transponder for transmitting said return pulses to said transmitter-receiver in response to receipts of said transmitted pulses from said transmitter-receiver, respectively, after a predetermined time delay therebetween.

13. In the system of claim 12 in which said gating means includes delay means coupled to receive said transmitted pulses for delaying said initiation of conduction of said clock pulses for a time delay interval in accordance with said predetermined time delay of said transponder.

14. In the system of claim 13 in which said delay means comprises
a first gating circuit coupled to receive said transmitted pulses and said clock pulses for initiating conduction therethrough of said clock pulses upon the occurrences of said transmitted pulses, respectively, and
a first pulse counter coupled to said first gating circuit for counting said clock pulses conducted therethrough, said first pulse counter having an output connected thereto in such a manner that delayed pulses are provided at said output in response to counting said clock pulses, delayed from the times of occurrence of said transmitted pulses by said time delay interval, respectively, 15. In the system of claim 14 in which said gating means further comprises a second gating circuit coupled to receive said delayed pulses and said clock pulses for initiating conduction therethrough of said clock pulses upon the occurrences of said delayed pulses, respectively.

16. In the system of claim 15 in which said second gating circuit comprises
a gating flip-flop having a set input coupled to receive said delayed pulses, and
an AND gate coupled to receive the output of said gating flip-flop and said clock pulses and having an output coupled to said range gate generating pulse counting means for conducting said clock pulses to said range gate generating pulse counting means in accordance with said output of said flip-flop.

17. In the system of claim 11 in which said range gate generating pulse counting means comprises
a down-counter,
said presetting means being coupled to said down-counter for presetting said down-counter with said digital predicted range signals,
said down-counter being coupled to said gating means for counting said clock pulses conducted therethrough in a backward direction from said preset predicted ranges,
decoding means coupled to said down-counter for providing an early gate pulse and a late gate pulse in response to predetermined counts of said down-counter, respectively, and circuit means coupled to said decoding means for generating said range gate pulses with leading and trailing edges derived from said early gate pulse and said late gate pulse respectively.

18. In the system of claim 17 in which said decoding means comprises means wherein said predetermined counts are disposed prior to and subsequent to the zero count of said down-counter, respectively.

19. In the system of claim 17 having said gating means coupled to receive said late gate pulse for terminating conduction of said clock pulses.

20. In the system of claim 1 in which said first multiplying means comprises means for effectively shifting said digital range error signals to the right by a predetermined number of digits thereby multiplying said digital range error signals by said first number.

21. In the system of claim 1 in which said second multiplying means comprises means for effectively shifting said accumulated sum of said digital range error signals to the right by a predetermined number of digits thereby multiplying said accumulated sum of said digital range error signals by said second number.

22. In the system of claim 10 in which said range predicting apparatus includes first, second and third registers for storing binary numbers, multiplexing means having a plurality of inputs and two outputs, said inputs to said multiplexing means being coupled to the outputs of said measured range pulse counter and said first, second and third registers, a binary adder having two inputs and an output, said inputs to said adder being coupled to said outputs of said multiplexing means, respectively, a distributor having an input and first, second, third, fourth and fifth outputs, said input to said distributor being coupled to said output of said adder and said first, second, third, fourth and fifth outputs of said distributor being coupled to the inputs of said measured range pulse counter, said range gate generating means and said first, second and third registers, respectively, and timing and control circuit means for providing control signals to said multiplexing means and said distributor to control said multiplexing means to connect selected inputs thereof to said outputs thereof and to control said distributor to connect the input thereof to selected outputs thereof.

23. In the system of claim 22 further including inverting means coupling said fourth output of said distributor to said input of said second register.

24. In the system of claim 23 with said measured range pulse counter temporarily storing the latest of said digital measured range signals and said third register temporarily storing said latest of said predicted range signals, in which said timing and control circuit means includes means for controlling said multiplexing means to connect said measured range pulse counter and said third register to said adder and for controlling said distributor to connect said input thereof to said fourth output thereof, thereby defining said subtracting means.

25. In the system of claim 24 with said first register temporarily storing the previously accumulated algebraic sum of prior digital range error signals and said second register storing said latest generated of said digital range error signals, in which said timing and control circuit means includes means for controlling said multiplexing means to connect said first and second registers to said adder and for controlling said distributor to connect said input thereof to said third output thereof, thereby defining said accumulating means.

26. In the system of claim 25 in which said output of each said first and second registers are coupled to at least two inputs to said multiplexing means, at least one of said inputs being a shifting input so constructed and arranged as to effectively shift the digits of the number transferred through said shifting input a predetermined number of digits to the right.

27. In the system of claim 26 in which said measured range counter and said first, second and third registers comprise parallel registers each having a plurality of stages, and each said input to said multiplexing means comprises a plurality of conductors coupled in parallel to the plurality of stages of the associated parallel register, said plurality of conductors of each said shifting input being coupled in parallel to the plurality of stages of the associated register in an offset manner with regard to digit significance whereby the digits of the number transferred from said associated register to said adder through said shifting input are effectively shifted to the right a predetermined number of digits in accordance with the offset connections.

28. In the system of claim 27 with said second register storing said latest generated of said digital range error signals, in which said timing and control circuit means includes means for controlling said multiplexing means to connect said second register to said adder through at least one of said shifting inputs and for controlling said distributor to connect said input thereof to said first output thereof, thereby defining said first multiplying means.

29. In the system of claim 28 with said measured range pulse counter temporarily storing said current range error signal and said third register temporarily storing said latest of said predicted range signals, in which said timing and control circuit means includes means for controlling said multiplexing means to connect said measured range pulse counter and said third register to said adder and for controlling said distributor to connect said input thereof to said fifth output thereof to provide the sum of said current range error signal and said latest of said predicted range signals, thereby partially defining said summing means.

30. In the system of claim 29 with said first register storing the algebraic sum of said digital range error signals, in which said timing and control circuit means includes means for controlling said multiplexing means to connect said first register to said adder through at least one of said shifting inputs and for controlling said distributor to connect said input thereof to said first output thereof, thereby defining said second multiplying means.

31. In the system of claim 30 with said measured range pulse counter temporarily storing said accumulated range error signal and said third register temporarily storing said sum of said latest of said predicted range signals and said current range error signal, in which said timing and control circuit means includes means for controlling said multiplexing means to connect said measured range pulse counter and said third register to said adder and for controlling said distributor to connect said input thereof to said second and fifth outputs thereof, thereby defining said summing means.

32. In the system of claim 31 with said third register storing said next of said predicted range signals, in which said timing and control circuit means includes means for controlling said multiplexing means to connect said third register to said adder and for controlling said distributor to connect said input thereof to said first output thereof, thereby transferring said next of said predicted range signals to said measured range pulse counter.

33. In the system of claim 32 further including
first binary to binary coded decimal converter means responsive to said measured range pulse counter for converting the most significant portion of said next of said predicted range signals from binary format into binary coded decimal format,
second binary to binary coded decimal converter means coupled to the least significant stages of said third register for converting the least significant portion of said next of said predicted range signals from binary format into binary coded decimal format, and
output means coupled to said first and second converter means for combining said most and least significant portions, in binary coded decimal format, of said next of said predicted range signals.

34. A method for use in a digital pulse tracker ranging system having a transmitter-receiver for transmitting pulses to an object and receiving corresponding return pulses from said object, respectively, for predicting the ranges with increased resolution from said transmitter-receiver to said object for said transmitted pulses, respectively, comprising the steps of
generating range gate pulses in accordance with said predicted ranges at the expected times of receipt of said return pulses, respectively,
digitally measuring said ranges by digitally measuring the transit times between said transmitted pulses and said corresponding return pulses that coincide with said range gate pulses, respectively,
computing the differences between said digital measured ranges and said digital predicted ranges to provide digital range errors, respectively,
algebraically accumulating said digital range errors to provide the algebraic sum thereof,
multiplying the latest generated of said digital range errors by a first number of absolute value less than unity to provide additional digits of resolution thereby providing a current range error,
multiplying said accumulated sum of said digital range errors by a second number of absolute value less than unity to provide additional digits of resolution thereby providing an accumulated range error, and
algebraically adding the latest of said predicted ranges, said current range error, and said accumulated range error to provide the next of said predicted ranges.

35. The method of claim 34 in which the step of multiplying the latest generated of said digital range errors by a first number comprises the step of effectively shifting said digital range errors to the right by a predetermined number of digits.

36. The method of claim 34 in which the step of multiplying said accumulated sum of said digital range errors by a second number comprises the step of effectively shifting said accumulated sum of said digital range errors to the right by a predetermined number of digits.

* * * * *